United States Patent Office 3,487,111
Patented Dec. 30, 1969

3,487,111
PRODUCTION OF 1,3-DIAMINES
Abraham N. Kurtz, Charleston, Wilbur E. Billups, Hurricane, and Melvin L. Farmer, Charleston, W. Va., assignors to Union Carbide Corporation, a corporation of New York
No Drawing. Filed Apr. 19, 1966, Ser. No. 543,559
Int. Cl. C07c *17/02, 17/38*
U.S. Cl. 260—585                                    7 Claims

ABSTRACT OF THE DISCLOSURE 1-butene is chlorinated in the liquid phase under "ionic" conditions to give 1,2-dichlorobutane; the latter is treated with a catalytic quantity of aluminum chloride to give a mixture of 1,2-dichlorobutane and 1,3-dichlorobutane in which the 1,3-dichlorobutane predominates to the extent of 93 percent. The 1,3-dichlorobutane is separated by distillation and treated with ammonia at 120–140° C. to give 45–79 percent yields of 1,3-diaminobutane, the yield being dependent on reaction conditions.

---

The present invention relates to a method for the production of diamines and dihalo hydrocarbons from olefins wherein the olefin is reacted with a halogen to form a dihalo alkane, which is then isomerized and reacted with $NH_3$. More specifically this invention is concerned with a method for the production of 1,3-alkyl or hydrogen substituted 1,3-diamino propanes from 1,3-alkyl or hydrogen substituted 1,3-dihalo propanes as well as the method for making such dihalo propanes.

It is known in the prior art that amines may be obtained by aminolysis of halogenated hydrocarbons. However, the various isomeric forms of the aliphatic diamines are difficult to obtain by isomerization of known diamines.

It has been found according to the present invention, that 1,3-lower alkyl or hydrogen substituted 1,3-diaminopropanes may be produced in excellent yields by the halogenation of propene and higher monoolefins to form a dihaloalkane which is subsequently isomerized to a 1,3 lower alkyl or hydrogen substituted 1,3-dihalopropane by means of a Friedel-Crafts catalyst. The isomerized dihaloalkane is then reacted with $NH_3$ to produce a diamine. In another aspect of the invention, diamines such as 1,3-diaminopropane, 1,3-diaminobutane and 2,4-diaminopentane are prepared by the aminolysis of similarly substituted dihaloalkanes. The dihaloalkanes are ordinarily obtained in various isomeric forms. However, isomers wherein the halogen moieties are separated by three carbon atoms must be used in order to obtain the corresponding amine.

Accordingly in one aspect of the present invention dihaloalkanes are isomerized by means of a Friedel-Crafts catalyst, to obtain substantial quantities of isomers in which the halogen moieties are separated by three carbon atoms, according to the following reactions:

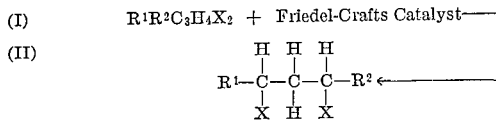

wherein the compound of Formula I is a dihaloalkane and in Formulas I and II, $R^1$ and $R^2$ are hydrogen or lower alkyl such as methyl ethyl, propyl; X is halogen such as F, Cl, Br or I; Cl, Br and I being preferred. Specific compounds obtained according to this reaction comprises 1,3-dichlorobutane, 1,3-dichloropropane and 2,4-dichloropentane. Isomerization at low temperatures (5–25° C.) are preferred especially with substantially pure 1,2-dichlorobutane or mixtures with the 1,3 isomer for obtaining high yields of substantially 1,3-dichlorobutane. Isomerization in this regard may be conducted over a broader range of temperatures including from 0–75° C.

In a specific embodiment it has been found that 5 mole percent aluminum chloride will isomerize 1,2-dichlorobutane either neat or dissolved in inert solvents such as carbon disulfide. Temperatures of 5–35° C. and reaction times of approximately 30–45 minutes are required. It has also been discovered that in the case of dichlorobutane, 1,2-dichlorobutane will undergo thermodynamic equilibrium. Thus, 5 mole percent aluminum chloride acting in pure 1,2-dichlorobutane at from 25–30° C. will isomerize the dichlorobutane to 93–94 percent of the 1,3-isomer and 6–7 percent of the 1,2-isomer. It has also been determined that these same yields are obtained upon isomerization with a Friedel-Crafts catalyst no matter what the ratio of 1,3- and 1,2-isomers in the starting material. Thus a method has been discovered for the production of excellent yields of 1,3-dichlorobutane from the 1,2-isomer.

It has also been found that the aminolysis of 1,3-dichlorobutane may be carried out with excess ammonia at temperatures of 110°–170° C., pressure of 200 to 3,400 p.s.i.g., reaction times of about one-half to four hours being sufficient for the complete conversion of the 1,3-dichlorobutane either with liquid ammonia; aqueous, methanolic, or ethanolic solvent systems. The yields of 1,3-diaminobutane increase with the feed molar ratio of ammonia to 1,3-dichlorobutane, being 44 percent at a 10:1 ratio, increasing regularly to 79 percent at 80:1 ratio, the yield being relatively independent of the solvent employed. Aqueous ammonia however, is preferred because of its ease of handling and low cost.

The preferred aminolysis conditions comprise a 10:1 molar ratio of 28 percent aqueous ammonia to the 1,3-dihaloalkane at 140° C. at a reaction time of 30 minutes. The reaction is preferably conducted at atmospheric pressure although 1–250 atmospheres pressures may be used especially 10–50 atmospheres. When aminolysis reaction temperatures of 170–180° C. are employed, reaction time may be reduced. Thus aminolysis can be conducted at temperatures ranging from 100–180° C. and at a pressure up to 3500 p.s.i.g. from 1–10 minutes; similarly at elevated pressures reaction times are also reduced.

In its broadest aspect the present invention contemplates the isomerization of any aliphatic dihaloalkane by means of a Friedel-Crafts catalyst to obtain dihalo isomers in which the halogen moieties are separated by the three carbon atoms, after which the isomer is converted to the diamine by aminolysis. Any vicinally substituted dihalo hydrocarbons may be used in the isomerization although the 1,2-isomers are preferred as starting materials. The dihaloalkanes may be prepared by any method known in the art although the preferred method of preparation comprises the vicinal addition to the carbon-carbon unsaturation of olefins represented by propylene, 1-butene, 1-pentene, and the like. Halogenation of these compounds under ionic conditions is especially suitable. For example, halogenation of 1-butene in the liquid phase under ionic conditions gives substantially pure 1,2-dihalobutane which may be subsequently isomerized by a Friedel-Crafts catalyst to obtain a 93–94 percent yield of a 1,3-isomer. Utilization of the "ionic" method assures production of large quantities of the 1,2-isomer and consequently, large yields of the 1,3-isomer may be obtained for aminolysis. The halogenation of olefins by the ionic method is further described by M. L. Poutsma in the Journal of the American Chemical Society, 87:19 Oct. 5, 1965, pp. 4285–4299.

Aliphatic amines in which the amine moieties are separated by three carbon atoms are useful in the production of pyrimidones that are subsequently condensed with urea and formaldehyde for the manufacture of permanent-crease imparting agents employed in the textile industry.

The following is an example of one of the permanent-crease agents obtained from the amines of this invention.

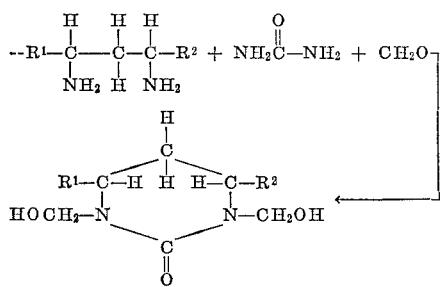

in which $R^1$ and $R^2$ have the same meaning previously given.

In addition to the aluminum chloride Friedel-Crafts catalyst, other catalysts are contemplated as being within the broad scope of the invention and include alkyl aluminum dichlorides, dialkyl aluminum dichlorides, trialkyl aluminum in which the alkyl groups may be methyl, ethyl, propyl or butyl, isomers thereof, or any combination thereof. Additional Friedel-Crafts catalysts include: $FeCl_3$, $HF$, $H_2SO_4$, $BF_3$, $AlCl_3$, $Al_2Cl_6$, $ZrCl_4$, $TaCl_5$, $SnCl_4$, $H_3PO_4$, $ZnCl_2$, $SbCl_5$, $AlCl_3 \cdot NaCl$, $AlBr_3$, $CbCl_5$, $BeCl_2$, $TiCl_4$, $TeCl_4$, $BiCl_3$.

The dihaloalkanes that are preferred comprise the chlorine-containing alkanes although bromo or iodo alkanes may also be employed. By the same token although the enumerated Friedel-Crafts catalysts mostly comprise the chloro substituted types either the bromo or iodo or fluoro varieties may be used.

In addition to carbon disulfide solvents, nitrobenzene or tetrachloroethane or any other solvents commonly employed in Friedel-Crafts catalytic reactions may also be used in the isomerization reaction of the present invention.

In the following non-limiting examples, the conversion yield and efficiency noted therein are determined according to the following relations:

Percent conversion =
$$\frac{\text{Moles charged* } - \text{ moles recovered*} \times 100}{\text{Moles charged*}}$$

Percent yield = $\frac{\text{Moles product obtained} \times 100}{\text{Moles charged*}}$ Percent efficiency = $\frac{\text{Yield} \times 100}{\text{Conversion}}$

* Starting material.

EXAMPLE I 1,2-dichlorobutane in the amount of 12.70 grams (0.10 mole) is added under air and moisture exclusion to a mixture of 0.667 gram aluminum chloride and 25 ml. carbon disulfide, and the whole stirred for 48 hours at ambient temperatures. Vapor phase chromatography shows the dichlorobutane reaction product to consist of 94.4 percent 1,3-dichlorobutane and 5.6 percent 1,2-dichlorobutane.

EXAMPLE II 1,3-dichlorobutane (120.0 grams of 98.8 mole percent purity), 200 ml. ethyl alcohol (No. 200 SD grade) and 1329 grams anhydrous ammonia are placed in a three liter rocking autoclave and heated to 120–132° C. for 3.5 hours at 2700–3400 p.s.i.g. After cooling the ammonia is vented and the contents of the autoclave are transferred with ethanol to a vacuum stripping system, giving 77 grams of a pale blue oil residue which crystallized after a few minutes. A total of 125 ml. of 40 percent aqueous sodium hydroxide (in 25 ml. portions) is added to this residue with cooling. The aqueous insoluble layer is distilled to give 13.0 grams of one cut B.P. 35–50° C. at 30–31 mm. Hg and 41.6 grams of a second cut B.P. 54–63° C. at 34–37 mm. Hg. The first cut contains 74.5 percent 1,3-diaminobutane and the second cut 93.6 percent 1,3-diaminobutane for a total yield of 59 percent.

EXAMPLE III

The procedure of Example II is repeated with 129.5 grams 1,3-dichlorobutane (98.1 percent pure), 1304 grams ammonia, and 200 ml. ethyl alcohol at 122–130° C. for four hours. Workup of the contents of the autoclave gives 117.5 grams of blue oil which is treated with 125 ml. of 40 percent NaOH to give 96.5 grams of a crude diamine phase from which 1,3-diaminobutane is recovered in 79 percent yield.

EXAMPLE IV

Twenty (20.0) grams (0.15 mole) $AlCl_3$ is added to 1,2-dichlorobutane (381.1 grams, 3.0 mole) over a period of 30 minutes, with cooling below 35° C. The mixture is stirred an additional two hours then washed with 300 ml. ice water. The water insoluble layer is combined with an ether extract of the aqueous layer, dried with sodium sulfate and distilled. The first cut of 148.5 grams with B.P. 128–131° C. contains 14.2 percent 1,2 - dichlorobutane and 85.0 percent 1,3-dichlorobutane; a second cut of 141.6 grams with B.P. 131–132° C., and a third cut of 18.0 grams with B.P. 57° C. at 1–120 mm., contains 1.9 percent 1,2-dichlorobutane and 98.1 percent 1,3-dichlorobutane for a total yield of 74 percent.

EXAMPLE V

Example IV is repeated except the isomerization is carried out mostly at 5°–10° C. and 88.7 percent yield of crude 1,3-dichlorobutane is obtained thus illustrating the advantage of isomerization at lower temperatures.

EXAMPLE VI

The method of Example II is repeated using a mixture of 88.9 grams (0.70 mole), 1,3-dichlorobutane, and 426 grams (7.0 mole minimum) 28.30 percent aqueous ammonia and treated at 140° C. for 37 minutes; the pressure amounts to 200 p.s.i.g. Workup of the product gives a 43 percent yield of 1,3-diaminobutane at 100 percent conversion of the 1,3-dichlorobutane.

EXAMPLES VII–X

Example III is repeated using solutions of $NH_3$ in either ethanol or methanol. The reactants are charged to a one liter autoclave and reacted at autogenous pressures. The reaction condition and results obtained are reported in Table 1. Conversions of 80–100% are obtained in all cases.

In comparing Examples VII and VIII it may be seen that higher yields of 1,3-diaminobutane are obtained at ratios of $NH_3$:1,3-dichlorobutane of approximately 80.

EXAMPLES XI–XII

Example III is repeated with the exception that liquid ammonia is reacted at 700–1200 p.s.i.g. and 110–115° C. in a one liter autoclave. The reaction conditions and results are reported in Table I and conversions of 80–100% are obtained in both cases.

TABLE I.—AMINATION OF 1,3-DICHLOROBUTANE 80–100% CONVERSION

| Ex. No. | NH₃:1,3-dichloro-butane | Percent Yield 1,3-diamino-butane | Solvent | Weight Percent NH₃ in Solvent | Temp., °C. | Maximum Reaction Pressure, p.s.i.g. | Reaction Time (hrs.) |
|---|---|---|---|---|---|---|---|
| VII | 76.6 | 79 | Ethanol | 89.2 | 120–130 | 2,350 | 4 |
| VIII | 20 | 57 | do | 68.7 | 130 | 1,000 | 4.5 |
| IX | 20 | 54.2 | Methanol | 68.8 | 130 | 900 | 4 |
| X | 20 | 49.4 | do | 68.8 | 130 | 960 | 4 |
| XI | 43 | 67.4 | Liquid ammonia | | 110–115 | 1,000 | 1 |
| XII | 40 | 56.6 | do | | 110–115 | 1,200 | 1 |

EXAMPLES XIII–XVI

Example II is repeated at various reaction conditions and ratios of reactants. These conditions and the results obtained are reported in Table II.

TABLE II.—AMINATION OF 1,3-DICHLOROBUTANE WITH AQUEOUS AMMONIA

| Ex. No | NH₃:1,3-dichloro-butane | Temp., °C. | Percent Yield, 1,3-diamino-butane | Reaction time (hrs) | Pressure (p.s.i.) | Percent NH₃. Conc. |
|---|---|---|---|---|---|---|
| XIII | 20/1 | 120 | 48.6 | 4 | 200 | 28 |
| XIV | 20/1 | 120 | 52.2 | ½ | 200 | 28 |
| XV | 10/1 | 140 | 43.0 | ½ | 200 | 23 |
| XVI | 10/1 | 140 | 44.6 | ½ | 350 | 38 |

What is claimed is:

1. A method for the synthesis of 1,3-diamines comprising contacting a dihaloalkane of the formula:

$$R^1R^2C_3H_4X_2$$

wherein X is vicinally substituted, with a Friedel-Crafts catalyst at a temperature ranging from 0–75° C. to obtain an isomerized dihaloalkane of the formula:

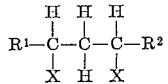

wherein $R^1$ and $R^2$ are lower alkyl or hydrogen and X is a halogen, and reacting said isomerized dihaloalkane with at least one aminating compound comprising NH₃, aqueous ammonia, methanolic ammonia or ethanolic ammonia, said aminating compound being used in a ratio of up to 80:1 with respect to said isomerized dihaloalkane at pressures up to 3500 p.s.i.g.

2. The method of claim 1 where said lower alkyl is seletced from at least one member of the group consisting of methyl, ethyl, and propyl.

3. The method of claim 1 where said halogen is selected from at least one member of the group consisting of fluorine, chlorine, bromine and iodine.

4. The method of claim 1 where said halogen comprises chlorine.

5. The method of claim 1 where said catalyst is selected from at least one member of the group consisting of an aluminum tri-halide, alkyl aluminum dihalide and trialkyl aluminum.

6. A method for the synthesis of 1,3-diamines comprising contacting at least one dihaloalkane prepared by the halogenation of an olefin said dihaloalkane being selected from at least one member of the group consisting of dichloropropane, dichlorobutane, and dichloropentane, with a Friedel-Crafts catalysts selected from at least one member of the group consisting of AlCl₃, dialkyl aluminum chloride, and trialkyl aluminum to obtain an isomer selected from the group consisting of 1,3-dichloropropane; 1,3-dichlorobutane; 1,3-dichloropentane and 2,4-dichloropentane and reacting said isomer with NH₃ at 100–180° C.

7. The method of claim 6 where said isomer is reacted with at least one aminating compound selected from the group consisting of NH₃, aqueous ammonia, methanolic ammonia and ethanolic ammonia said aminating compound being used in a ratio of up to 80:1 with respect to said 1,3-isomer or 2,4-isomer at pressures up to 3500 p.s.i.g.

References Cited

UNITED STATES PATENTS 2,480,266   8/1949   Schmerling _____ 260—583

CHARLES B. PARKER, Primary Examiner

R. L. RAYMOND, Assistant Examiner

U.S. Cl. X.R.

260—251, 658